United States Patent [19]

Williams

[11] Patent Number: 4,655,436
[45] Date of Patent: Apr. 7, 1987

[54] METHOD AND APPARATUS FOR RECOVERING AND REUSING ENERGY FROM A MELTING FURNACE

[76] Inventor: Thomas W. Williams, 6100 Halifax Ave. South, Edina, Minn. 55424

[21] Appl. No.: 807,282

[22] Filed: Dec. 10, 1985

[51] Int. Cl.[4] .............................................. F27D 13/00
[52] U.S. Cl. ...................... 266/44; 266/155; 266/159; 266/901; 373/80; 432/9; 432/28
[58] Field of Search ................. 266/155, 159, 901, 44; 373/80; 432/9, 28

[56] References Cited

U.S. PATENT DOCUMENTS

| | | | |
|---|---|---|---|
| 1,513,875 | 11/1924 | Wilke | 75/65 R |
| 1,833,130 | 11/1931 | Roe | 110/304 |
| 2,620,269 | 12/1952 | Haney et al. | 75/65 R |
| 3,476,372 | 11/1969 | Tezuka | 266/142 |
| 3,669,436 | 6/1972 | Kemmetmueller | 266/143 |
| 3,993,342 | 1/1976 | Schramm | 410/24.1 |
| 4,132,394 | 1/1979 | Johnson et al. | 266/138 |
| 4,299,376 | 11/1981 | Weiss | 266/205 |
| 4,340,207 | 7/1982 | Bruhn et al. | 266/155 |
| 4,445,849 | 5/1984 | Bouille | 432/128 |
| 4,470,804 | 9/1984 | Geijer et al. | 432/9 |
| 4,559,629 | 12/1985 | Fedele Dell'Oste | 373/80 |

FOREIGN PATENT DOCUMENTS

| | | | |
|---|---|---|---|
| 95793 | 12/1983 | European Pat. Off. | 266/901 |
| 15790 | 1/1984 | Japan | 266/155 |

Primary Examiner—L. DeWayne Rutledge
Assistant Examiner—Robert L. McDowell
Attorney, Agent, or Firm—Dorsey & Whitney

[57] ABSTRACT

A heat recovery and storage system for use in connection with a melting furnace. In such system, heat from the exhaust gas of a melting furnace is recovered and used to preheat scrap metal and to maintain such preheated scrap metal in its preheated form until it is charged into the melting furnace.

24 Claims, 5 Drawing Figures

METHOD AND APPARATUS FOR RECOVERING AND REUSING ENERGY FROM A MELTING FURNACE

BACKGROUND OF THE INVENTION

The present invention relates generally to an energy recovery system for a melting furnace, and more particularly, to a method and apparatus for recovering and reclaiming the energy from the effluent gas stream of a melting furnace and reusing such energy for preheating a subsequent charge and maintaining such charge in a preheated condition until introduction into the melting furnace.

During normal operation of a steel or other mill which utilizes melting furnaces for melting steel, etc. for further processing, exhaust effluent gases ranging in temperatures up to 2,500°-2,800° F., are exhausted for ultimate release into the atmosphere. However, before such effluent gases can be exhausted into the atmosphere, they must be cleaned to remove contaminants and waste materials. This removal is commonly done by processing the gases through air pollution abatement equipment. Such equipment in most cases requires the effluent gas to be cooled to a temperature below 500° F. This cooling is presently accomplished by diluting the furnace effluent gases with ambient air so that the resulting air mixture will be at an acceptably low temperature for entering the pollution abatement equipment. This requires very large exhaust fans as well as large air pollution abatement equipment. Also, and of more importance, the energy available in such effluent gases is often wasted and released into the atmosphere.

Limited efforts have been made to overcome the above mentioned problems and to recover the heat from the effluent gas for reuse. In two known systems, the effluent gases are utilized to preheat a subsequent furnace charge. This heat transfer is accomplished by forcing the hot effluent gas through a charge bucket so as to preheat the next charge prior to introduction into the furnace. One of these systems utilizes the effluent gas directly by forcing it into and through the charging bucket so as to heat the scrap metal. A major drawback of this system is that the effluent gas is very dirty and heavily laden with iron oxides and other contaminants which are filtered out by the scrap charge and reintroduced into the furnace. This results in a contaminated melt, thereby adversely affecting the quality of the steel produced, and also results in a considerable amount of energy being required to heat the contaminants. The second system utilizes an air to air heat exchanger to transfer the energy from the dirty effluent gas to clean air which is then forced through the charge bucket. The dirty effluent gas then exits the heat exchanger and is routed to the air pollution abatement equipment.

A significant shortcoming of both systems is that the transfer of energy from the effluent gas to the incoming charge can only be accomplished when the energy is available (i.e.) when the effluent gas is being released from the furnace during a melt. Between the time that the furnace is tapped and the charge is introduced for the next melt, a period of several hours can elapse. During this passage of time, much of the energy in the preheated scrap is dissipated into the atmosphere. Further, the high temperatures of the effluent gases (reaching 2,500°-2,800° F.) burns off much of the material in the incoming scrap such as oils, greases, fabrics, plastics, and also melts and vaporizes low melting materials such as leads and zincs. This results in extremely noxious fumes which, in the case of zincs and leads, may be toxic. Also, the heat utilized in the burning of such materials and the heat transferred to the charging bucket itself is lost to the system. Additionally exposing the charging buckets to these temperatures results in higher maintenance costs of the buckets.

In U.S. Pat. No. 4,340,207, a waste heat recovery system is shown which includes a cupola, a pair of heat exchangers and a storage tank for heat transfer fluid. Although the storage tank appears to have the ability to store heat in the heat transfer fluid system while the cupola is idling, such system lacks means for preheating a subsequent charge and maintaining the same in such preheated condition.

Accordingly, there is a need for a heat recovery system for use with melting furnaces which are capable of inexpensively and efficiently recovering heat from the effluent gases for reuse in preheating subsequent charges and maintaining such charges in a preheated condition for future melting operations.

SUMMARY OF THE INVENTION

In contrast to systems of the prior art, the present invention relates to a heat recovery system for a melting furnace in a facility such as a steel mill and includes a method and apparatus for recovering heat from the melting furnace and reusing the same to preheat scrap for the next melt and to maintain such preheated scrap in its preheated condition until proceeding with the next melt.

More specifically, the method and apparatus of the present invention involves routing the effluent gas from the melting furnace through a heat exchanger which transfers heat from the effluent gas to a heat transfer fluid such as a thermal oil, a heat transfer salt, etc. This heated transfer fluid is then conducted to a heat storage vessel or sink for the purpose of storing the heat so that it can be utilized for preheating the scrap metal and maintaining the same in a preheated condition until proceeding with the next melt. Preferably such heat storage sink or vessel contains a heat storage material such as a eutetic or phase change material, ceramics, or other similar materials. The heat storage vessel includes one or more compartments or heat maintenance chambers for receiving the next charge and means for transferring heat from the heat storage vessel to such compartments and maintaining such compartments in a heated condition until the next melt.

Means are also provided for removing the preheated scrap from the heat sink compartments and charging the same into the furnace through a conveyor system or charging bucket. By utilizing the heat storage sink or vessel, the heat which is recovered from a melting process can be stored and retained so that it is not dissipated or lost while waiting for the next melt.

Following passage through the heat storage vessel, the heat transfer fluid is directed through a second heat exchanger in which air is heated. This heated air is then passed through a mechanism such as a rotary heater, steel mesh conveyor or other means for transferring the heat energy to scrap metal or the like for the purpose of preheating the same. The preheated scrap from the heater is then transferred by conveyor or other means to the compartments in the heat storage vessel.

A number of advantages over presently existing systems are achieved by the method and apparatus of the present invention. First, in the preferred system in which the heat transfer fluid is a liquid, the recovered energy is transferred throughout the mill via a liquid piping system as opposed to the relatively large ductwork system required when using a gas as the heat transfer fluid. Secondly, because of the lower and more constant temperatures which are applied to the scrap metal during preheating, the problems associated with noxious gases and the melting of metals such as leads and zincs is eliminated. Thirdly, much of the heat which is utilized in prior recovery systems through the burn off of such materials does not occur in the preheating step of the present invention, but is accomplished in the furnace during the melt, thus avoiding the loss of such heat. Fourthly, in the preferred method and apparatus of the present invention, recovered heat is not passed through the charging buckets, thus, the maintenance of such buckets and the loss of heat resulting from their heating is reduced.

Accordingly, it is an object of the present invention to provide an improved method and apparatus for recovering heat from a melting furnace for reuse in the preheating of scrap metal for the next charge.

Another object of the present invention is to provide a more efficient method and apparatus for recovering heat from a melting furnace.

A further object of the present invention is to provide a method and apparatus for recovering heat from a melting furnace and storing the same so that the preheated charge can be maintained and the recovered heat can be fully utilized during the next melt.

A still further object of the present invention is to provide a method and apparatus for recovering heat from a melt furnace having means for retaining the recovered heat in a form which can be reintroduced into the system at the most opportune time.

These and other objects of the present invention will become apparent with reference to the drawings, the description of the preferred method and apparatus, and the appended claims.

DESCRIPTION OF THE PREFERRED EMBODIMENT AND METHOD

Figure 1:
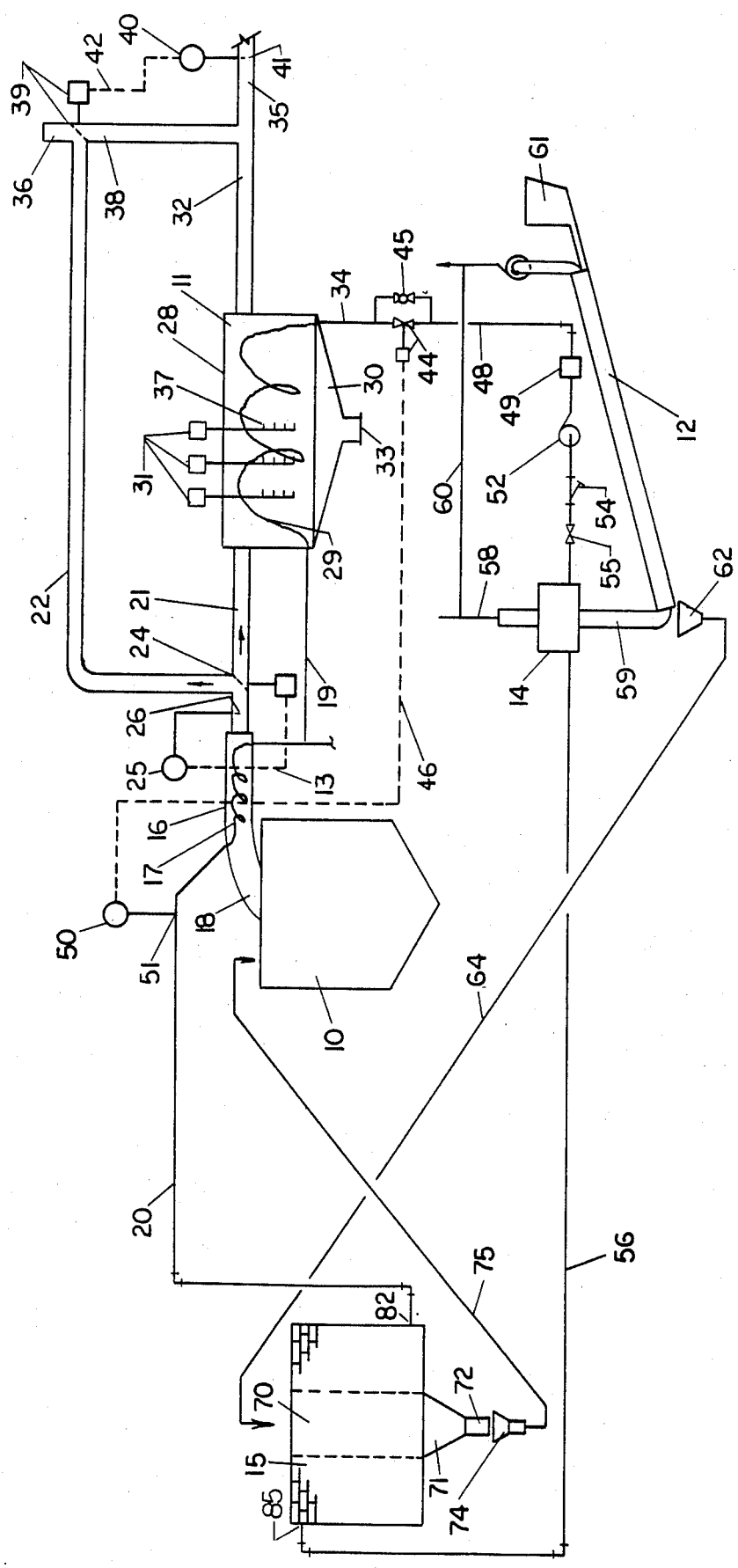
FIG. 1 is a general schematic layout of the system embodying the method and apparatus of the present invention.

The general structure of the apparatus and system of the present invention is illustrated best in FIG. 1. In general, the system relates to an apparatus and method for recovering heat from the effluent gas exhausted from a conventional melting furnace 10 of the type commonly used in steel mills for the melting of scrap metal and the like. Although a variety of melting furnaces can be used, a common melting furnace to which the method and apparatus of the present invention are applicable is an electric arc melting furnace. Although not specifically illustrated in FIG. 1, but common to such furnaces, a tap or other means is provided near the bottom of the furnace 10 to take off the melted steel when it has been fully melted and reaches the desired temperatures. In general, temperatures within the furnace 10 will reach temperatures in excess of 3,000° F.

In addition, the furnace 10, the system of the present invention generally includes a first heat exchanger 11, a heating means 12 for preheating the scrap metal, a second heat exchanger 14 and a heat storage vessel 15 for storing heat recovered from the effluent gas. These system components cooperate with one another to produce a system in which heat from the effluent gas can be recovered and selectively used to preheat scrap metal and maintain such scrap metal in a preheated condition until such metal is ready to be charged into the furnace 10.

The effluent gas from the furnace 10 exits through the conduit 18. Preferably the conduit 18 includes a heat exchange element 16 in the form of what is commonly known in the industry as a liquid cooled elbow 16. This member 16 includes a plurality of coils 17 which are exposed to the hot effluent gas as it leaves the furnace 10. One end of the coils 17 is in communication with a conduit 19 while the other end of the the coils 17 is in communication with the conduit 20. Heat transfer fluid which enters the member 16 through the inlet 19 is heated as a result of exposure to the hot effluent gas and then exits through an outlet and into the conduit 20.

After passing through the conduit 18, the hot effluent gas is directed either into the heat exchanger conduit 21 or the bypass conduit 22. An on-off damper 24 is provided at the end of the conduit 18 for selectively directing the effluent gas into either the conduit 21 or the conduit 22. The damper is electrically connected with a temperature control member 25 by the wire means 13. The control member 25 includes a probe 26 in communication with the effluent gas near the end of the conduit, 18. The respective position of the damper 24 is controlled in response to the temperature of the effluent gas in the conduit 18. If the temperature sensed by the probe 26 is less than the desired minimum temperature of the heat transfer fluid, the position of the damper 24 is moved to direct the effluent gas into the bypass conduit 22. On the other hand, if the temperature sensed by the probe 26 is greater than the desired temperature of the transfer fluid, the position of the damper 24 is moved to the position in which the effluent gas is directed into the conduit 21.

The outlet end of the conduit 21 is connected with one end of the heat exchanger 11. The heat exchanger 11 includes a housing 28, a plurality of heat transfer coils 29 disposed within the housing 28, and a lower hopper 30 and discharge port 33 for removing soot and various other impurities and contaminants from the exchanger 11. The heat exchanger 11 is also provided with a plurality of soot blowers 31 which are used to clean soot and other impurities that collect from time to time on the coils 29. In the preferred embodiment, the soot blowers 31 are adapted for rotation within the housing 28 and include a plurality of exit nozzles 37 for the purpose of blowing compressed air against the surfaces of the coils 29. This is done periodically to remove soot and other impurities from the coils 29. The soot, etc. then falls into the hopper 30 where it can be periodically removed through the port 33. In the preferred system, the heat exchanger 11 is an air to liquid heat exchanger.

The air which enters the exchanger 11 through the conduit 21, is allowed to pass through the exchanger 11 and into contact with the coils 29. After passing through the exchanger 11, the effluent air exits the exchanger 11 through the conduit 32. The heat transfer fluid enters the exchanger 11 from the conduit 34 and is pumped through the coils 29 and then into the conduit 19. It should be noted that this heat exchanger 11 is a counter current system in which the effluent air passes through the exchanger in one direction (to the right as viewed in FIG. 1) while the heat transfer fluid passes through the system in the other direction (to the left as viewed in FIG. 1).

Upon exiting through the conduit 32, the effluent air is then directed into the conduit 35. The conduit 35 directs this exiting effluent air to an appropriate fan and bag house or other conventional pollution abatement equipment (not shown) for removing the impurities, etc.

If the damper 24 is positioned to direct the effluent air into the bypass conduit 22, the effluent air is directed to the conduit 38 and then into the conduit 35 for transfer to the pollution abatement equipment. A modulating or variable damper 39 is provided at the junction between the conduit 22, the conduit 38, and an ambient air supply conduit 36. The conduit 36 is positioned to control the supply of diluted or ambient air into the conduit 38, and thus into the conduit 35. The amount of such dilution controls the temperature of the resulting air in the conduit 35.

If the air in the conduit 35 is above the maximum temperature permitted by the pollution abatement equipment being used, it must be diluted with ambient air or otherwise cooled to a temperature which can be handled by the particular pollution control equipment. In most such equipment currently in existence, the maximum temperature permitted is 500° F. In the method and apparatus of the present invention, the temperature of the air in the conduit 35 is controlled by the damper 39. The damper 39 is electrically connected by the wires 42 to a temperature control member 40 which in turn includes a temperature probe 41 disposed within the conduit 35. If the temperature in the conduit 35 is greater than the maximum allowed, this will be sensed by the probe 41 which, through the control member 40, will result in the damper 39 being opened an appropriate amount to permit a greater amount of cool ambient air to be supplied into the conduit 38 through the conduit 36. This ambient air, which is at a relatively low temperature (60–70° F.) is then combined with either the effluent gas from the conduit 32 or the effluent gas from the conduit 22. If, on the other hand, the temperature in the conduit 35 is below the maximum permitted temperature, the damper 39 will be fully closed, thereby precluding the entry of any ambient or dilution air. It should be noted that the damper 39 is a modulating or variable damper. This permits the opening of the damper 39 to be varied to allow a greater or a lesser flow of dilution air.

In accordance with the method and apparatus of the present invention, it is contemplated that the heat transfer fluid will be a liquid over the range of temperatures at which the system is intended to operate. Such liquid can be selected from any one of a number of possible heat transfer liquids, although the preferred method and apparatus of the present invention contemplates a heat transfer liquid which is operable between temperatures of about 100° F. and 2,000° F. A number of heat transfer liquids such as thermal oils or thermal salts can be utilized. One example of a thermal oil which can be utilized is a thermal oil manufactured by Monsanto Chemical Company and sold under the trademark THERMONAL 75. This thermal oil has a set up temperature of about 145° F. and a maximum breakdown temperature of about 750° F. Thus, when using this thermal oil as the heat transfer fluid, the temperature of such medium must be maintained between these two limits.

An example of a thermal salt which can be utilized in the present invention is one manufactured by Olin Chemical Company and known as "Olin Heat Transfer Salt 222". This thermal salt is a combination of sodium nitrate and potassium nitrate which sets up at temperatures below about 430° F. and breaks down at temperatures in excess of about 1,100° F. Thus, when using this particular thermal salt, it is necessary to maintain the temperature of the heat transfer liquid within this range.

The maintenance of the temperature of the heat transfer fluid is controlled principally by the control valve 44 positioned in the conduit 34 and the temperature control member 50. The member 50 includes a temperature probe 51 connected with the conduit 20. The control valve 44 functions to control the flow rate of the heat transfer fluid from the conduit 48 to the conduit 34, and thus through the heat exchanger 11. The heat exchange fluid then passes through the coils 29 into the conduit 19, through the coils 17, and into the conduit 20. If the temperature of the fluid in the conduit 20, as sensed by the member 50, is greater than that desired (either about 720° F. in the case of the above-described thermal oil or about 1,100° F. in the case of the above-described thermal salt), the control valve 44 is opened to increase the flow of transfer fluid through the exchanger 11. This increased flow will result in a general lowering of the temperature of the fluid in the conduit 20. It should be noted that the temperature control member 50 is electrically connected to the control valve 44 by appropriate electrical wire means 46. A flow balance control valve 45 connected between the conduits 48 and 34 is provided for the purpose of maintaining a minimum flow of heat transfer fluid through the system.

The system also includes an auxiliary liquid heater 49 positioned in the conduit 48 for the purpose of heating the heat transfer fluid if this should become necessary. In the event the temperature sensed by the member 50 is below the temperature needed or desired for the particular heat transfer fluid being used, the auxiliary heater 49 is activated to provide the necessary heat to such fluid. In the case of the thermal oil described above, the temperature below which the heater 49 would be activated is about 145° F., while in the case of the thermal salt described above, the temperature below which the heater 49 would be activated is about 450° F.

A liquid pump 52 is provided in the conduit 48 for supplying sufficient pumping pressure to circulate the heat transfer fluid through the system. This pump 52 is a non-positive displacement liquid pump which is capable of operating within the range of temperatures dictated by the heat transfer fluid being utilized and generating the flow rates needed. A strainer or filter member 54 and a gate valve 55 are also provided in the conduit 48.

After passing through the heat exchangers 11 and 16, the heat transfer fluid is conducted by the conduit 20 to a heat storage sink or vessel 15. The heat transfer liquid is circulated through this vessel 15 in the manner described in greater detail below and exits from the vessel 15 through the conduit 56. This conduit 56 then conducts the heat transfer liquid to the heat exchanger 14 for the purpose of heating clean air. This air is provided to the heat exchanger 14 through the conduit 58 and, as a result of exposure to coils of heated transfer fluid within the exchanger 14, exits as hot air through the conduit 59. This hot, clean air is then directed via the conduit 59 into communication with scrap metal in the scrap preheater 12.

During passage of the scrap metal through the heater 12, the clean, hot air from the conduit 59, is allowed to directly contact the scrap metal for the purpose of preheating the same. Although a variety of heaters can be utilized for this purpose, the preferred method and apparatus contemplate use of a rotary heater in which the scrap metal is tumbled through the cylindrical heater member while passing hot air through such member in the opposite direction. Other heaters, however, such as steel mesh conveyor heaters and the like, can also be used for directly contacting the scrap metal with the clean air from the conduit 59. Preferably, however, the heater 12 should maximize contact between the air and the scrap metal during heating and avoid hot spots such as are created by passing hot air through a charging bucket. During operation, scrap metal enters one end of the heater 12 through the hopper 61 and exits at the other end where it is transferred into the conveyor hopper 62.

In the preferred system utilizing the above-described thermal oil, the temperature of the thermal oil in the conduit 56 will be about 700° F. This oil will pass through the heat exchanger coil 14 and heat the air coming in through the conduit 58. The temperature of this incoming air will vary; however, it will normally be about 100° F. As a result of passage of the heat transfer fluid through the heat exchanger 14, such air will be heated and will exit through the conduit 59 at a temperature of about 650° F. The thermal oil, in turn, will exit from the heat exchanger 14 at a temperature of about 300° F. During passage of this hot air through the scrap heater 12 where it directly contacts the scrap metal, the temperature of the air will be reduced to about 100° F. This air is then recycled through the conduit 60, with possible supplementation by ambient or other preheated air, to the conduit 58, and thus the exchanger 14.

Figure 2:
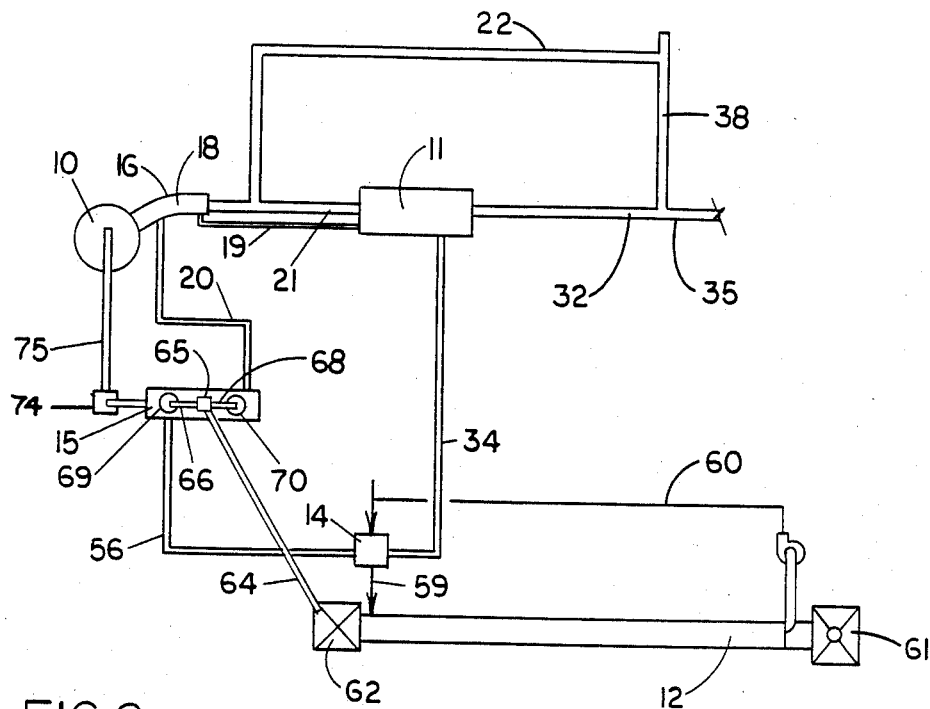
FIG. 2 is a further schematic layout of the system of the present invention showing the conveyor portion of the system in greater detail.

The preheated scrap metal which exits from the heater 12 and into the hopper 62 is then conveyed by the transfer conveyor 64 to the heat storage vessel 15. At this point, the preheated scrap metal is deposited into a heat maintenance chamber or compartment within the heat storage vessel 15. In the apparatus of the present invention, as illustrated best in FIG. 2, the heat storage vessel 15 includes a pair of heat maintenance chambers or compartments 69 and 70. Means are provided in the form of the transfer hopper 65 and distribution conveyors 66 and 68, for depositing the preheated scrap metal into either the compartment 69 or the compartment 70. Such a transfer hopper 65 and distribution conveyor sections 66 and 68 are well known in the art.

With reference again to FIG. 1, the compartment 70, and thus also the compartment 69, comprises a generally cylindrical portion extending through the heat storage vessel 15. Positioned below the vessel 15 and connected with each of the compartments 69 and 70 is a funnel-shaped portion 71 and a discharge opening 72 for selectively dumping or discharging the preheated scrap metal contained within the chamber 70 into the hopper 74. The hopper 74 is connected with a transfer conveyor 75 for conveying the preheated scrap metal from the chamber 70, into the furnace 10 for melting.

Although not specifically illustrated, it is contemplated that each of the chambers 69 and 70 can be provided with a scale or other means for determining the weight or amount of scrap metal within each compartment. Such means can then be utilized to provide a charge of the desired size to the melting furnace 10. In the preferred embodiment the cylindrical side walls of the chambers 69 and 70 are constructed of material which readily conducts heat and which also is able to withstand the temperatures at which the system is intended to operate. It is contemplated that the side walls of the chambers 69 and 70 could be constructed of steel approximately one inch thick.

Figure 3:
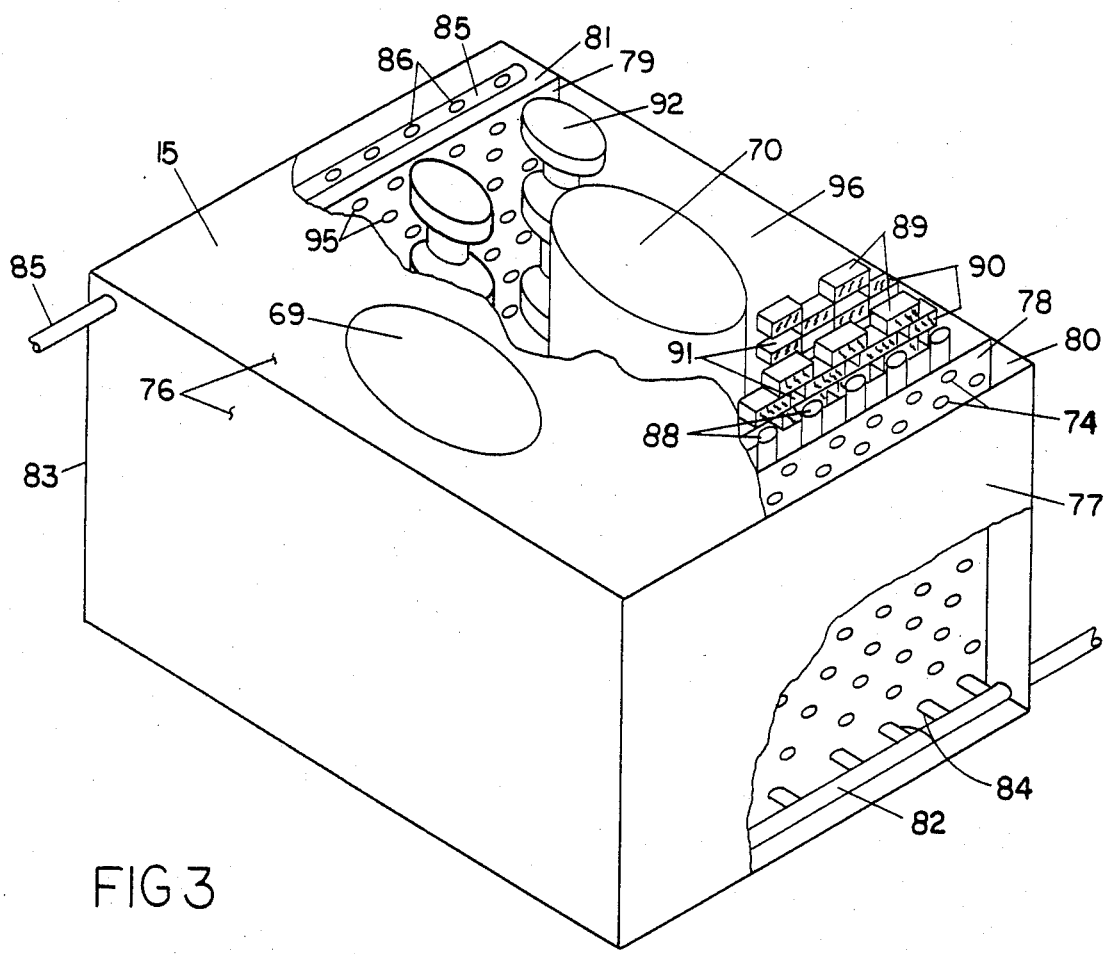
FIG. 3 is a pictorial illustration of the heat storage vessel, with portions broken away, in accordance with the method and apparatus of the present invention.
Figure 4:
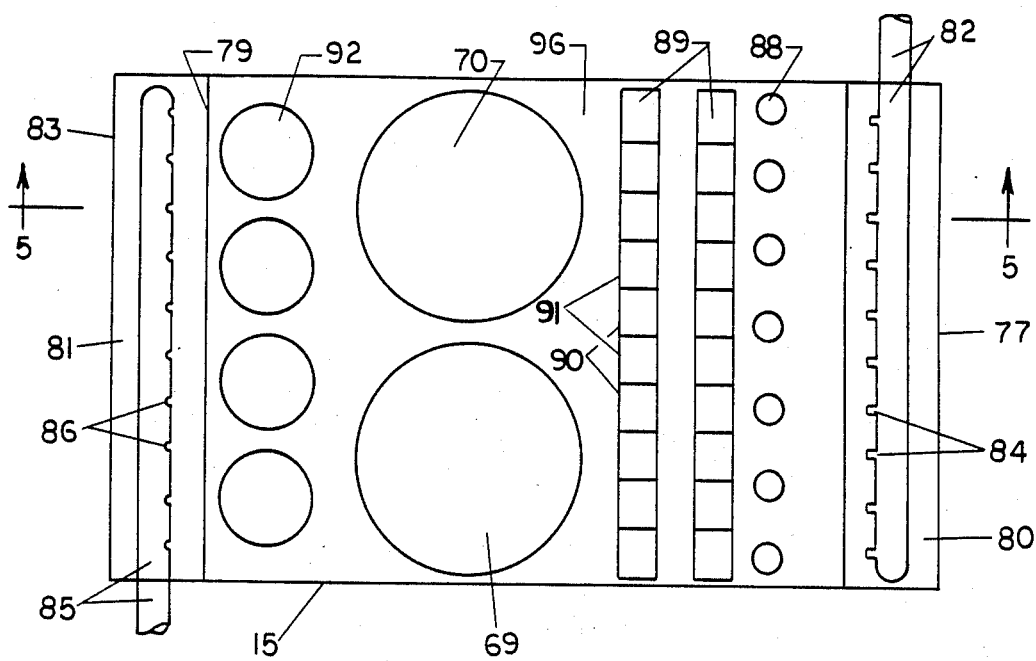
FIG. 4 is an elevational top view, partially in section, of the heat storage vessel illustrated in FIG. 3.
Figure 5:
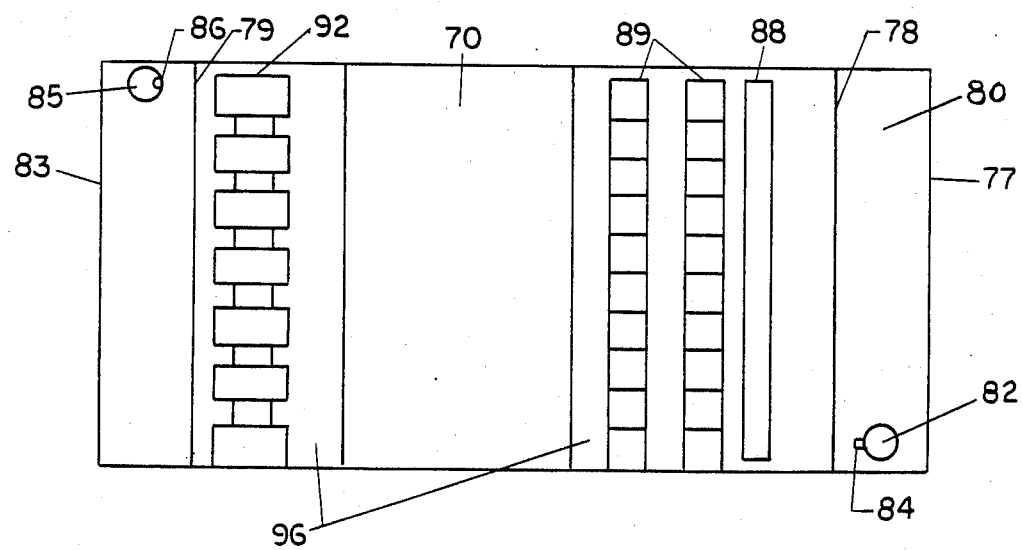
FIG. 5 is an elevational side view, partially in section, of the heat storage vessel shown in FIG. 3 and as viewed along the section line 5—5.

Reference is next made to FIGS. 3, 4, and 5 illustrating the preferred construction of the heat storage sink or vessel 15. As illustrated, the heat storage vessel 15 is a generally rectangularly shaped apparatus having an exterior housing 76 within which the operative structure of the heat storage vessel is contained. The housing 76 includes spaced top and bottom walls which are generally parallel to one another and spaced end walls and side walls which are also spaced from one another and parallel to each other, respectively. A first or inlet end 77 of the vessel 15 is provided with a heat transfer fluid distribution chamber 80. This chamber 80 is defined on one side by the inner surface of the end wall 77 and on its other side by the perforated distribution plate 78. The perforated distribution plate 78 includes a plurality of holes or openings 74 extending throughout its entire surface for the purpose of controlling the flow of heat transfer fluid from the chamber 80 in a generally uniform manner into the interior of the storage vessel 15. A bottom portion of the chamber 80 is provided with a heat transfer fluid supply manifold 82 having a plurality of outlets 84 for uniformly distributing the heat transfer fluid throughout the entire length of the chamber 80. The supply manifold, 82, is connected with the conduit 20 (FIG. 1).

The second or outlet end 83 of the vessel 15 is also provided with a chamber 81 defined between the inner surface of the end wall 83 and a perforated plate 79 extending across the entire section of the vessel 15. Similar to the distribution plate 78, the plate 79 is provided with a plurality of holes or openings 95 throughout its entire surface. The plate 79 and the holes 95 result in the flow of heat transfer fluid through the plate 79 in a substantially uniform and controlled manner into the chamber 81. The upper end of the chamber 81 is provided with a heat transfer fluid return manifold 85 which is provided with a plurality of holes or openings 86 for receiving heat transfer fluid from the chamber 81. An end of the manifold 85 is connected to the conduit 56.

Positioned between the perforated plates 78 and 79 is a heat storage chamber 96. Positioned within this chamber 96 are the pair of heat maintenance chambers or compartments 69 and 70. Although the preferred embodiment illustrates a pair of such chambers, it is contemplated that the heat storage vessel 15 can include only a single such chamber or compartment or two or more such chambers or compartments.

Although not illustrated, the preferred embodiment of the vessel 15 will be heavily insulated to maintain heat within the chamber 96 and to reduce the surface temperature of the vessel iteself. It is contemplated that insulation sufficient to provide an R factor of about 50 is acceptable. Each of the chambers 69 and 70 is provided with a cover (not shown). The housing 76 should be constructed of a material capable of withstanding the temperatures and other environmental conditions within which the system operates. A one-quarter inch thick steel plate is acceptable.

In the preferred embodiment, the heat storage chamber 96 is filled with a heat transfer fluid in the form of a thermal oil, a thermal salt, or some other heat transfer material. In many circumstances, it is anticipated that the bulk of the heat transfer fluid itself will be sufficient to store and retain heat recovered from the hot effluent gas of the melting furnace 10; however, in some circumstances, it may be desirable to provide additional heat storage means within the chamber 96. Three different examples of acceptable heat storage means are illustrated in FIGS. 3, 4, and 5.

One such means is illustrated in the form of a plurality of rods 88. As shown, these rods 88 extend in a vertical direction. It is contemplated that if such rods are utilized, they would be distributed throughout the entirety of the chamber 96. In the preferred embodiment, these rods contain a eutectic or phase change material such as various salts, salt mixtures, etc. which have a phase change temperature falling within the operative ranges contemplated by the present system. Heat provided to the chamber 96 by the heat transfer fluid is stored within these rods 88 as a result of changing the phase of the material within the rods when the heat transfer fluid within the system is heated to a sufficient level. Then, when the furnace 10 is shut down during the tapping of molten steel or during the recharging cycle, the heat which is stored in the chamber 96 and within the rods 88 maintains the preheated scrap metal within the chambers 69 and 70 in a preheated form.

It is contemplated that a variety of eutectic or phase change materials could be utilized in the rods or containers 88. The material should, however, have a phase change temperature, usually from a solid to a liquid, near the upper end of the temperature range acceptable for the heat transfer fluid. When the above described thermal oil is utilized (having an operative temperature range of 145° F. to 750° F.), the phase change temperature should be about 700° F. When a thermal salt of the type previously described is utilized (having an operative temperature range of about 430° F. to 1100° F.), the phase change temperature should be about 1000° F. The phase change material should also have a relatively high heat of fusion. A material with a heat of fusion between about 100 and 200 BTU's/lb. is desirable. The material should also be a good conductor and be stable with respect to its fusion temperature.

A second example of a heat storage material is illustrated by the brick or ceramic lattice work 89. This lattice work 89 consists of a plurality of bricks or other similar material 90 provided throughout the interior of the chamber 96 in the form of a plurality of walls. Each of these walls also includes a plurality of missing bricks 91 to permit the flow of heat transfer fluid through the chamber 96. These walls of ceramic or other material assist in retaining the heat which is recovered during operation of the furnace and maintains the preheated scrap metal within the chambers 69 and 70 in such preheated state until the next charging of the furnace 10.

A third type of heat storage material illustrated in FIGS. 3, 4, and 5 consists of large chunks or mass of cast iron 92 or the like. As with the other examples of a heat storage material, it is contemplated that if this means is utilized, the pieces of cast iron 92 or other material would be distributed throughout the chamber 96 for the purpose of storing heat for utilization when the furnace 10 is not being heated.

It would normally be expected that only one of several different types of heat storage means would be utilized for any one heat storage vessel; however, it is contemplated that a combination of any one or more of the heat storage means disclosed, as well as others, could be utilized. The principal function of the heat storage means is to increase the heat storage capability of the chamber 96 over and above that provided by the heat transfer fluid itself.

Having described the the preferred method and the structure of the preferred embodiment in detail, the operation of the system can be understood as follows. When the furnace 10 is being operated, hot exhaust gases are exhausted through the conduit 18. If the temperature of these gases is greater than the desired temperature at which the heat transfer medium is to be maintained, the damper 24 is positioned to allow all of the exhaust gas to be directed into the conduit 21. This gas passes through the conduit 21, through the heat exchanger 11, and out through the conduit 32. Heat transfer fluid is directed through the heat exchanger 11 in a countercurrent direction from the conduit 34, through the coils 29, and into the conduit 19. During the passage of the heat transfer medium through this exchanger 11, its temperature (in the case of the abovedescribed thermal oil) is increased from about 300° F. to about 650°–700° F.

If the furnace 10 is not operating, or is operating at a temperature which results in the exhaust gas being less than the desired maintenance temperature of the transfer fluid, the damper 24 is moved to a position which directs the furnace exhaust into the bypass conduit 22. Both the gas in this conduit 22, as well as that in the conduit 32, are ultimately directed to the conduit 35 for transfer to appropriate pollution abatement equipment.

When the furnace is in operation and the exhaust gas is sufficiently hot, the heat transfer fluid will be maintained at the desired maximum temperature and will continue to circulate from the conduit 20, through the heat storage vessel 15, through the conduit 56, through the heat exchanger 14, and back through the heat exchanger 11. As described above, this continuous circulation of heat transfer fluid will heat the fluid within the chamber 96 (FIGS. 3, 4, and 5), as well as the heat storage members within that chamber to the temperature of the heat transfer fluid.

The heat transfer fluid within this chamber 96 is utilized to preheat scrap metal via the heat exchanger 14 and the scrap heater 12 and to also maintain preheated scrap metal contained within the chambers 69 and 70 in a preheated condition until it is ready to be charged into the furnace 10. In this respect, it should be noted that there are often periods of time extending up to several hours or more during which the furnace 10 is inoperative or is operating at reduced temperatures. Unless the heat is somehow stored, the heat from the preheated scrap metal is dissipated into the surrounding atmosphere and the charge of scrap metal which is to be introduced into the furnace is either cold or not preheated to the level which is possible in accordance with the present invention.

Thus, the method and apparatus of the present invention permits the recovery of heat from a melting furnace and the storage and subsequent utilization of such heat for the purpose of preheating scrap metal and maintaining the same in such preheated form until it is charged into the melting furnace.

Although the description of the preferred embodiment and method has been quite specific, it is contemplated that various changes could be made without deviating from the spirit thereof. Accordingly, it is intended that the scope of the present invention be dictated by the appended claims rather than by the description of the preferred method and embodiment.

I claim:

1. An apparatus for recovering waste heat from a melting furnace and using the same to preheat a subsequent charge comprising:
    a first heat exchanger for transferring heat from the effluent gas of said melting furnace to a heat transfer fluid;
    a heat storage vessel having a housing defining a heat storage chamber and at least one heat maintenance chamber disposed within said heat storage chamber for maintaining a subsequent charge in a preheated condition;
    first conducting means for conducting said heat transfer fluid from said first heat exchanger into said heat storage chamber;
    heat transfer means for transferring heat from said heat transfer fluid to a subsequent charge for preheating the same;
    second conducting means for conducting said heat transfer fluid from said heat storage chamber to said heat transfer means; and
    third conducting means for conducting said heat transfer fluid from said heat transfer means to said first heat exchanger.

2. The apparatus of claim 1 wherein said heat transfer means includes a second heat exchanger for transferring heat from said heat transfer fluid to a charge heating fluid and a heater means for transferring heat from said charge heating fluid to a subsequent 3. The apparatus of claim 2 wherein said charge heating fluid is air.

4. The apparatus of claim 3 wherein said heater means comprises a rotary heater.

5. The apparatus of claim 1 wherein said first heat exchanger is a liquid to gas heat exchanger and said heat transfer fluid is a liquid.

6. The apparatus of claim 5 including control means for maintaining said heat transfer fluid within a desired range of temperatures.

7. The apparatus of claim 6 wherein said control means includes a flow control valve for controlling the flow of heat transfer fluid through said first, second and third conducting means and an auxiliary heater for selectively heating said heat transfer fluid.

8. The apparatus of claim 7 wherein said control means includes temperature control means.

9. The apparatus of claim 8 wherein said control means includes a damper for directing said effluent gas either to said first heat exchanger or to a bypass of said first heat exchanger.

10. The apparatus of claim 1 including pump means for pumping said heat transfer fluid through said first, second and third conducting means.

11. The apparatus of claim 1 including means for introducing a preheated charge into said heat maintenance chamber and means for removing said preheated charge from said heat maintenance chamber.

12. The apparatus of claim 11 wherein said heat maintenance chamber extends through said heat storage chamber and includes a first opening at its top for introducing a preheated charge and a second opening at its bottom for removing said preheated charge.

13. The apparatus of claim 5 wherein said heat storage vessel includes a heat transfer fluid distribution chamber on one end thereof for distributing heat transfer fluid from said first conducting means into said heat storage chamber.

14. The apparatus of claim 13 wherein said distribution chamber is defined on one side by a perforated plate having a plurality of holes permitting the flow of heat transfer fluid therethrough.

15. The apparatus of claim 5 including heat storage means disposed within said heat storage chamber.

16. The apparatus of claim 15 wherein said heat storage means includes a plurality of containers containing a phase change material.

17. The apparatus of claim 16 wherein said phase change material has a phase change temperature within the temperature range at which said heat transfer fluid is maintained.

18. The apparatus of claim 1 including first conveyor means for conveying a charge from said heat transfer means to said heat maintenance chamber and second conveyor means for conveying a charge from said heat maintenance chamber to said melting furnace.

19. The apparatus of claim 1 wherein said furnace is an arc melting furnace.

20. A method of recovering waste heat from a melting furnace and using the same to preheat a subsequent charge comprising the steps of:
    transferring heat from the effluent gas of said melting furnace to a heat transfer fluid;
    conducting said heat transfer fluid to a heat storage chamber;
    maintaining a first preheated charge in such preheated condition in a heat maintenance chamber within said heat storage chamber;
    conducting said heat transfer fluid from said heat storage chamber to a heat transfer means;
    preheating a second charge in said heat transfer means by transferring heat from said heat transfer fluid to said charge; and
    transferring the second preheated charge to said heat maintenance chamber.

21. The method of claim 20 wherein said heat transfer fluid is a liquid.

22. The method of claim 21 including maintaining the temperature of said heat transfer fluid within a desired range of temperatures.

23. The method of claim 22 wherein said heat transfer fluid is a thermal oil.

24. The method of claim 22 wherein said heat transfer fluid is a thermal salt.

* * * * *